350-389 SR

XR 3,609,002

[redacted]

United States Patent

[11] 3,609,002

[72] Inventors David B. Fraser
Berkeley Heights;
Juan R. Maldonado, North Plainfield; Allen H. Meitzler, Morristown, all of N.J.

[21] Appl. No. 889,087
[22] Filed Dec. 30, 1969
[45] Patented Sept. 28, 1971
[73] Assignee Bell Telephone Laboratories, Incorporated Murray Hill, Berkeley Heights, N.J.

[54] MULTIPLE ELEMENT OPTICAL MEMORY STRUCTURES USING FINE GRAIN FERROELECTRIC CERAMICS
11 Claims, 7 Drawing Figs.

[52] U.S. Cl. ........ 350/150, 250/219 Q, 340/173.2, 350/157
[51] Int. Cl. ........ G02f 3/00
[50] Field of Search ........ 350/147, 150, 157, 160; 340/173 SS; 250/219 ID

[56] References Cited

UNITED STATES PATENTS

| | | | |
|---|---|---|---|
| 3,435,425 | 3/1969 | Hastings | 250/219 ID |
| 3,475,736 | 10/1969 | Kurtz | 350/150 X |
| 3,512,864 | 5/1970 | Haertling et al. | 350/150 |
| 3,517,206 | 6/1970 | Oliver | 350/150 X |
| 3,521,271 | 7/1970 | Rappaport | 350/150 UX |
| 3,531,182 | 9/1970 | Land et al. | 350/150 |

OTHER REFERENCES

Thacher et al., " Ferroelectric Electrooptic Cermaics with Reduced Scattering" IEEE Trans. Electron Devices Vol. ED-16, No. 6 (June, 1969) pp. 515-521. FE-EO digest

*Primary Examiner*—David Schonberg
*Assistant Examiner*—Paul R. Miller
*Attorneys*—R. J. Guenther and Arthur J. Torsiglieri

ABSTRACT: An optical image storage and display device is obtained by using the electrical polarization property of a plate of fine grain polycrystalline electrooptic ferroelectric, such as lead zirconate-lead titanate. Under the influence of an applied electric field, the polarization of a selected portion of the plate of ferroelectric locally is switched through a predetermined angle of less than or equal to 90°, if and when a scanning light beam or an electron beam is incident upon a photoconductive film deposited on the plate. Readout of the resulting permanent polarization is accomplished by means of another scanning light beam traversing the ferroelectric plate, the plate being located between a polarizer and an analyzer. Thereafter, the polarization of the plate can be switched back through an appropriate angle to its initial state ("erased"), by means of another applied electric field.

PATENTED SEP 28 1971 3,609,002

D. B. FRASER
INVENTORS: J. R. MALDONADO
A. H. MEITZLER
BY D Kaplan
ATTORNEY

FIG. 2.1

MULTIPLE ELEMENT OPTICAL MEMORY STRUCTURES USING FINE GRAIN FERROELECTRIC CERAMICS

FIELD OF THE INVENTION

This invention relates to optical memory systems, and more particularly, to optical image storage and display devices utilizing ferroelectric materials as memory elements.

BACKGROUND OF THE INVENTION

In communication systems involving the transmission of a sequence of pictures from a transmitter to a receiver (television systems) the frequency bandwidth requirements are ordinarily orders of magnitude higher than in the transmission of a voice message. This is due to the fact that the bandwidth requirement is directly proportional to the rate of data transmission, measured in bits of information per second for example, which is ordinarily much greater for picture than for voice transmission. Such a large increase in bandwidth correspondingly greatly increases the required transmission facilities (coaxial lines, etc.). It is therefore desirable to have a system in which the data rate is reduced, thereby reducing the bandwidth and the required transmission capability.

One method of accomplishing a reduction in the data rate of picture transmission involves the transmission of only a portion of the picture during each period of time corresponding to the human optical persistence time. Such a system thus requires some sort of memory (image storage) at the receiver, in order to preserve the information concerning the remaining portions of the picture which have been transmitted earlier.

In particular, ferroelectric optical memory systems are useful at the receiver for performing optical memory functions. The recently discovered desirable properties of fine grain polycrystalline ferroelectric ceramics would seem to indicate their especial suitability as the memory element of such optical systems, due to the reproducibility and reliability of switching the remanent electric polarization of these ferroelectrics. By fine grain ferroelectrics is meant such materials as lead zirconate-lead titanate in which the crystal size is of the order of 1 micron, so that the domains are so restricted in size that only an insignificant amount of domain wall propagation can take place therein. By means of electric fields applied thereto, such ferroelectrics can reproducibly be switched from a state of remanent electric polarization oriented in one direction to a state of remanent electric polarization oriented in another direction at some angle thereto; i.e., in the limit of large rotation, a 90° spatial rotation of the remanent polarization. It would be desirable to have apparatus utilizing the advantageous properties of these fine grain ferroelectrics for the memory function in optical memory systems, including optical display systems.

SUMMARY OF THE INVENTION

According to this invention, an optical memory system includes a layer of fine grain electro-optic ferroelectric ceramic material in an electrical environment capable of switching the state of remanent electric polarization at selected portions thereof by a rotation through a predetermined angle advantageously less than or equal to 90°. These portions are selected in accordance with a desired picture pattern consisting of bright and dark portions. Thereby, the phase retardation of an optical readout beam passing through those selected portions of the ferroelectric layer is correspondingly switched from one value to another. As known in the art, by means of a polarizer and an analyzer, the resulting pattern of phase retardations can be converted into a corresponding pattern of intensity in the optical readout beam at various portions of its cross section, corresponding to the switched portions of the ferroelectric layer. Thereby, the intensity of the cross section of the optical beam itself is impressed with a pattern of bright and dark portions corresponding to the switched and unswitched portions of the ferroelectric layer. A display of this optical beam results in the desired picture pattern. This pattern can persist for considerable time (days or more) in the ferroelectric ceramic layer due to the memory property of the ferroelectric layer, unless and until the pattern is erased by applying a second electric field to the ferroelectric. Thus, an erasable optical image storage and display system is provided by a pattern of rotations of the remanent polarization in the ceramic material and by a readout beam of light in conjunction with a polarizer and an analyzer.

In a specific embodiment of the invention, an electrode array of horizontal parallel metallic strips is disposed upon a first major surface of a fine grain ferroelectric ceramic plate. The horizontal strip-spaces (gaps) between successive electrodes define the horizontal "lines" of the ultimate picture frame. Upon the remainder of this first major surface is disposed a photoconductive film, such as cadmium sulphide. Likewise, another photoconductive film is disposed upon an opposite major surface of the ferroelectric plate, parallel to the first major surface thereof. An optically transparent, electrically conducting film, such as tin oxide or indium oxide, is disposed upon the photoconductive film on the second major surface of the ferroelectric plate.

Each horizontal "line" of the picture frame is initially "erased" by means of a first electric field applied to the ferroelectric plate. This electric field is supplied by a DC voltage source connected across the particular pair of electrodes in the horizontal array straddling that particular horizontal "line." Thereby, the first electric field is produced in that portion of the ceramic plate between two horizontal "lines." The state of the electric polarization of the ferroelectric plate in the region between these two electrodes is switched by the first electric field to a longitudinal or "L" state, i.e., the state of remanent electric polarization perpendicular to the horizontal lines, parallel to the plane of the plate. Thereafter, the first DC voltage is disconnected, and a second DC voltage source is then applied across the ferroelectric plate, i.e., across the transparent conductive film all the electrodes in the array. While the second DC voltage is thus applied, an optical "WRITE-IN" beam (laser beam, for example) is incident on the plate along the horizontal line in order to illuminate the plate in accordance with a desired pattern. The second DC voltage in cooperation with the photoconductive phenomena in the photoconductive films thereby produces a second electric field of appreciable size only in the illuminated portions of the plate. The illuminated portions of the plate are thereby switched into the transverse of "I" state, i.e., the state of remanent polarization perpendicular to the plane of the plate.

READOUT of the pattern of "L" and "I" states of remanent polarization in the ferroelectric plate is obtained by locating the plate between a suitable polarizer and an analyzer in the presence of a "READOUT" beam of light. Thereby, the cross section of the "READOUT" beam exiting from the analyzer is impressed with a pattern of bright and dark portions corresponding respectively to the "I" and "L" states in the ferroelectric plate. Thus, the "READOUT" beam contains the information corresponding to the WRITE-IN" process in the plate, as desired in this optical display device.

This invention together with its features, objects, and advantages may be better understood from a reading of the following detailed description when read in conjunction with the diagram in which.

Figures 1, 4:
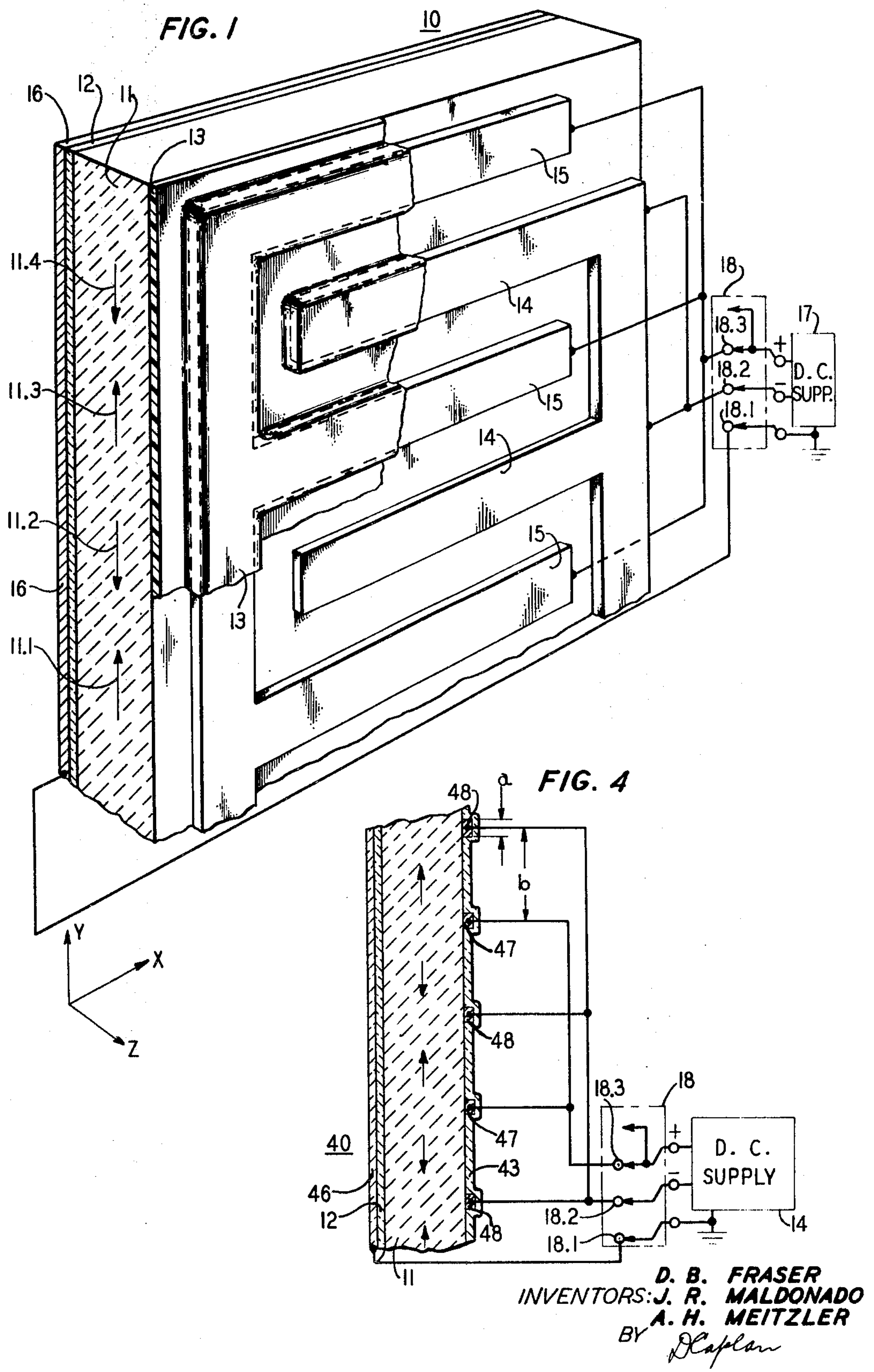
FIG. 1 is a perspective front view, partly in cross section, of a fine grain ferroelectric optical memory and display device, according to a specific embodiment of the invention.
Figure 2:
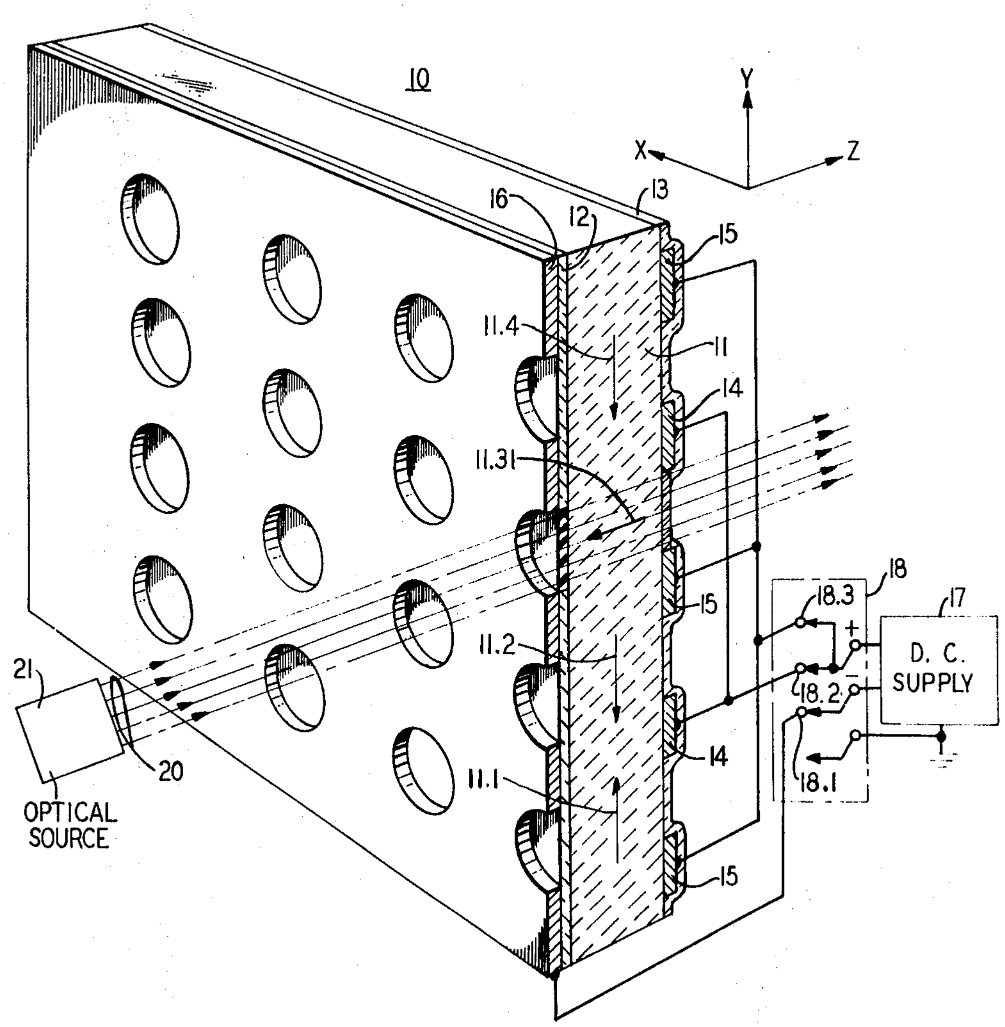
FIG. 2 is a perspective rear view, partly in cross section, of the fine grain ferroelectric optical memory and display device shown in FIG. 1 together with an optical write-in source.
Figure 3:
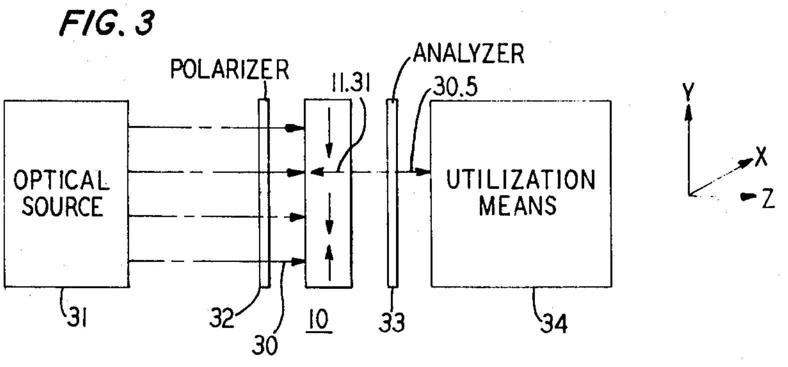
Figure 4:
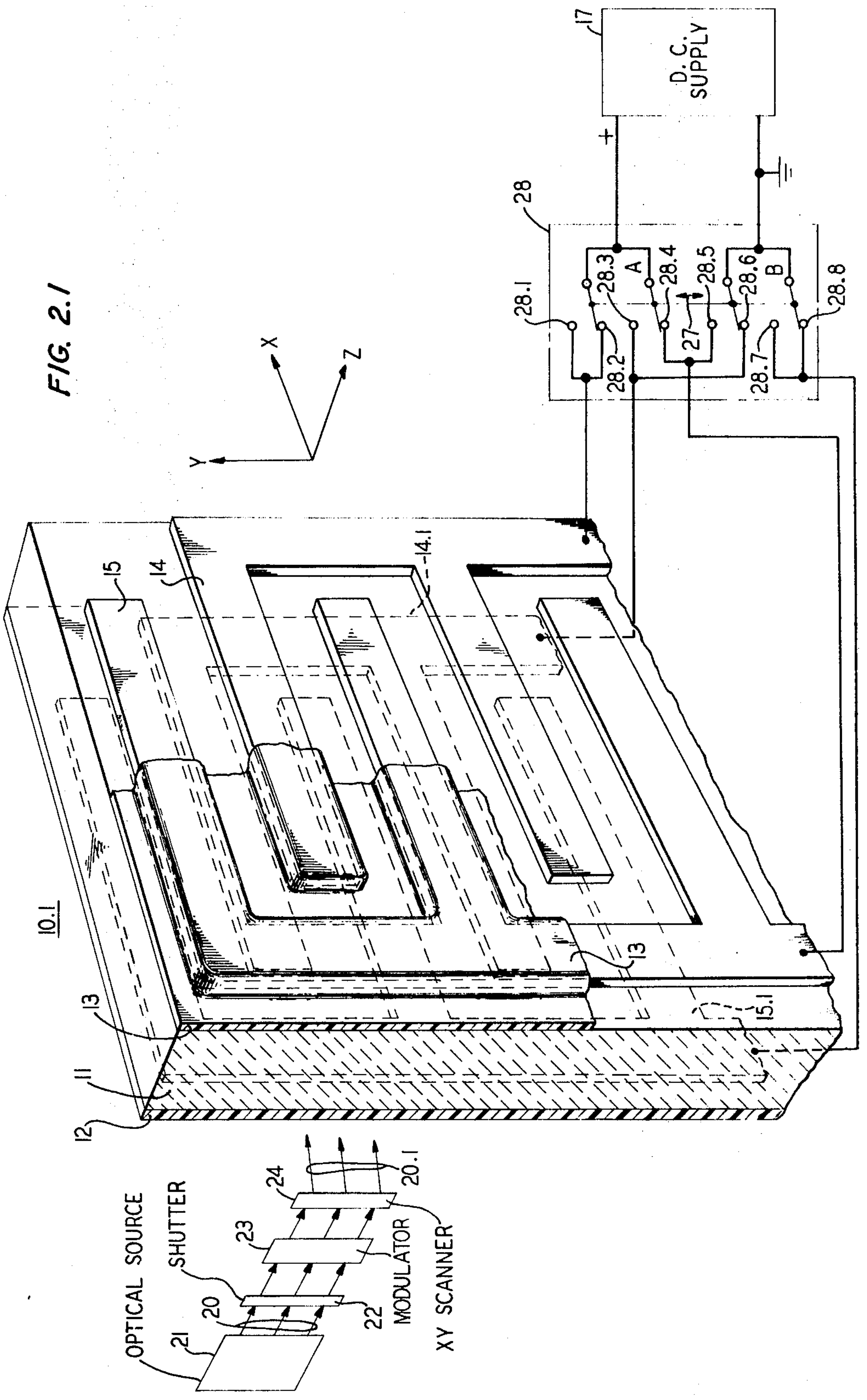
Figure 5:
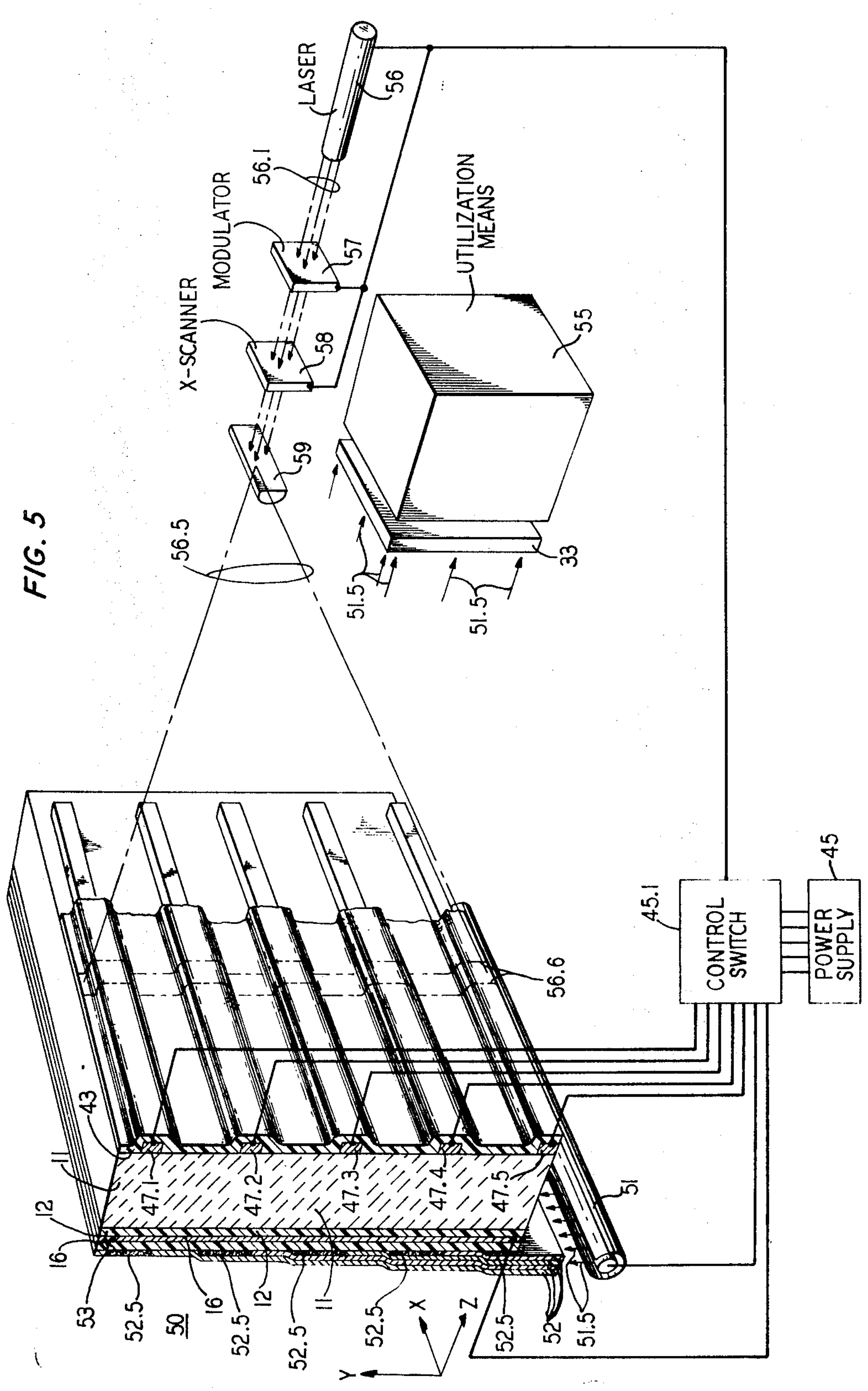
Figure 6:
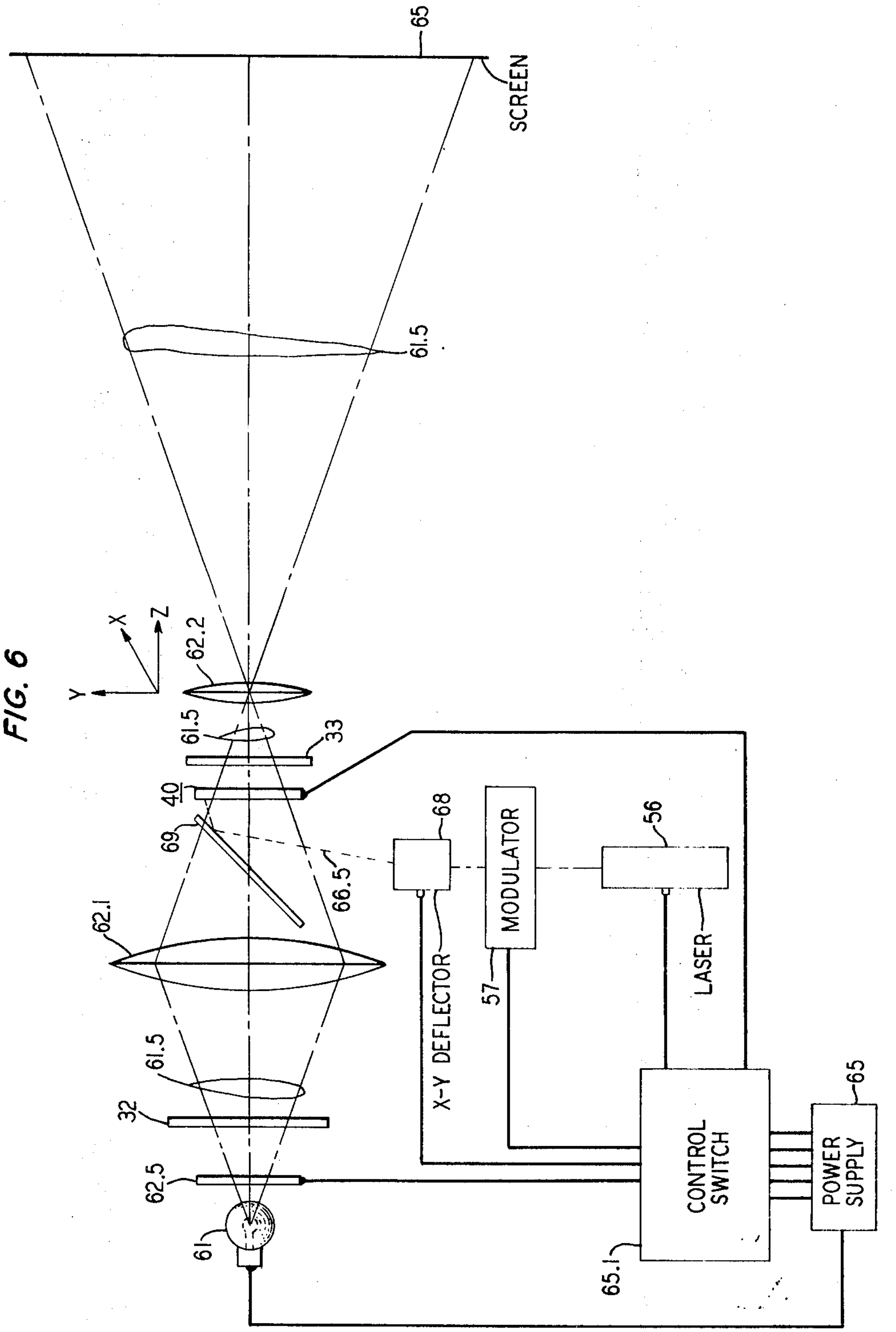

FIG. 2.1 is a perspective front view, partly in cross section, of an alternate embodiment of a fine grain ferroelectric optical memory and display device, together with an optical write-in source including scanning thereof;

FIG. 3 is a diagram of a system illustrating readout of the optical display device shown in FIGS. 1 and 2;

FIG. 4 is a sectional side view of a fine grain ferroelectric optical memory and display device, according to another specific embodiment of the invention;

FIG. 5 is a diagram, partly in cross section, of an optical memory and display system including integrated optical readout, according to yet another specific embodiment of the invention; and FIG. 6 is a diagram of an optical memory and display system including two-dimensional optical scanning write-in according to yet another specific embodiment of the invention.

DETAILED DESCRIPTION

FIG. 1 shows a perspective view of an optical data array memory display device 10 during its "RESET" (or "ERASE" period; whereas FIG. 2 shown a rear perspective view of the same device, during the "WRITE-IN" period. In the device 10, a parallel plate 11 is made of fine grain electro-optic ferroelectric ceramic material. A suitable material consists essentially of fine grain lead zirconate 65 percent—lead titanate 35 percent, doped with percent lanthanum (as manufactured by a hot-pressing technique and as provided commercially by the Clevite Corporation, for example). Advantageously, the size of the grains in the ceramic is less than about 2 microns. The rear major surface of the ceramic plate 11 is covered with a photoconductive layer 12; while portions of the front major surface are plated with mutually interdigitated metal electrodes 14 and 15. Typically, the spaces between neighboring electrodes in these arrays are of the order of 0.01 inch, and are formed by a conventional vapor deposition technique.

A photoconductive layer 13 coats the remaining portion of the front surface. For structural strength, the photoconductive layer 13 is continuous, and thus also advantageously coats the otherwise exposed surfaces of the interdigitated electrodes 14 and 15. Advantageously, the photoconductive layers 12 and 13 have a dielectric constant which is of the order of at least 100 times lower than that of the material in the ceramic plate 11. As explained below, the thickness of each of the photoconductive layers 12 and 13 is advantageously selected to be at least one-tenth that of the ferroelectric ceramic plate 11.

For example, a layer of photoconductive cadmium sulphide about 10 microns thick formed by conventional sputtering techniques can be used for each of the layers 12 and 13. Alternatively, a layer of photoconductive polyvinyl carbazole about 5 microns thick, applied by dip-coating techniques, can be used for this purpose.

As shown in FIG. 2 an apertured metal electrode mask 16 is disposed on the photoconductive layer 12 on the rear surface. The apertures in this mask 16 advantageously are all located directly opposite the horizontal strip-shaped spacings between the interdigitated electrodes 14 and 15.

Various electric fields to be described below, are produced in the ferroelectric plate 11 by virtue of the DC supply voltage source 17 applied to the electrodes 14, 15, and 16 through a three-terminal electrical switch 18.

As shown in FIGS. 1 and 2, the switch 18 has three output terminals. One of these terminals 18.1 is connected to the electrode 16, and the other two of these terminals 18.2 and 18.3 are connected to the electrodes 14 and 15, respectively. When the switch 18 is in the position indicated in FIG. 1, the source 17 produces an electric field in the ferroelectric plate 11 which is essentially parallel to the major surfaces in the vertical $\pm y$ direction. As a result, the remanent electric polarizations in the plate 11, in the regions underneath the horizontal strip spaces between the electrodes 14 and 15, are like wise set in the $\pm y$ direction, as indicated by the arrows 11.1–11.4 in FIG. 1. In this condition, the plate 11 is said to be in the "ERASE" or "RESET" state, i.e., the state in which portions of the ferroelectric plate 11 underneath the horizontal spaces between electrodes 14 and 15, and thus underneath the apertures in the mask 16, are in a state of remanent polarization parallel to the $\pm y$ direction, or at an acute angle with respect thereto. Typically, an electric field of about $20\times10^3$volt/cm. produced for 10 milliseconds in the plate 11 by the DC source 14 is sufficient for the purpose of "RESET" to obtain sufficient birefringence.

In order to maximize the lifetime or the ceramic 11, the polarization in the "RESET" state is advantageously set in an acute angle, rather than parallel, to the $\pm y$ direction. For simplicity in explaining and understanding the invention, however, the "Reset" state has been illustrated in the drawings with the polarization parallel to the $\pm y$ direction, while also ignoring the effects of fringing fields on the uniformity of the polarization in the ceramic 11.

In order to subject the plate 11 to a "WRITE-IN" of information to be displayed as shown in FIG. 2, a beam of light 20 from an optical write-in source 21, typically a laser, is used. The beam of light 20 serves as a "write-in" beam. This "write-in" beam 20 is incident only upon selected portions of the ferroelectric plate 11, for example, the neighborhood of the arrow 11.31 underneath selected aperture(s) in the mask 16. For use with a pair of 5-micron-thick layers 12 and 13 of photoconductive polyvinyl carbazole, the "write-in" beam 20 typically has a white light flux of the order of 2mW/cm$^2$. During this "WRITE-IN" period, the switch 18 is placed in a position to connect one side of the DC supply 17 in common to the interdigitated electrodes 14 and 15, and to connect the other side of the DC supply 17 to the metal mask 16. For the "-WRITE-IN" process, an electric field of about 20X $10^3$ volt/cm. in the plate 11 for a period of about 10 milliseconds is sufficient. However, as known in the art, the time constant of photoconductive polyvinyl carbazole (in the layers 12 and 13) in response to optical radiation is of the order of tenths of seconds, so that the total tome of exposure of the device 10 to the electric field in the presence of the "write-in" beam 20 advantageously is also of of order of tenths of second. In case photoconductive cadmium sulfide is used for the layers 12 and 13, then the time period of the "WRITE-IN" process can be shortened to about 10 milliseconds or less.

During this "WRITE-IN" connection of the switch 18, terminal 18.1 is made negative and terminals 18.2 and 18.3 are both made equally positive, so that the ferroelectric plate 11 is subjected to an electric field in the normal $z$ direction.

However, as stated above, the photoconductive layers 12 and 13 advantageously are selected to have a dielectric constant of the order of 100 times less than that of the PZT in the ceramic plate 11; whereas the thickness of each of the photoconductive layers 12 and 13 advantageously is selected to be at least one-tenth that of the plate 11. Thus, any electric fields produced in the plate 11 in the $z$ direction (normal to the interface between the plate 11 and the mutually parallel photoconductive layers 12 and 13) will be at least an order of magnitude smaller in the ferroelectric plate 11 than in the photoconductive layers 12 and 13. However, the photoconductive layers 12 and 13 are both made electrically conducting in the neighborhood of arrow 11.31 by reason of optical radiation in the beam 20 being incident thereon. Therefore, the $z$ direction of electric field in the ferroelectric plate 11 in the region of the arrow 11.31 becomes as high or even higher than in the photoconductive layers 12 and 13. Thus, the remanent polarization in the plate 11 is locally switched into the $z$ direction by this electric field therein, as indicated by the arrow 11.31 in FIG. 2. The remainder of the arrows 11.1, 11.2, and 11.4 indicated in FIG. 2 remain in the $\pm y$ direction that is, the beam 20 has not affected the remanent polarization in the respective neighborhoods of these arrows.

After the beam 20 has in effect rotated the remanent polarization of the plate 11 in the neighborhood of the arrow 11.31, the beam is either shut off or car similarly "WRITE-IN" information at other selected aperture locations in the metal mask 16. Thus, the beam 20 can "WRITE-IN" at various selected portions of the plate 11 in accordance with any preselected pattern.

"READOUT" of this pattern in the plate 11 can be accomplished in an optical system of the type illustrated in FIG. 3. A plane wave beam of light 30 from the optical source 31 is incident upon the plate 10 after traversing an optical polarizer 32. Advantageously, the polarizer 32 is oriented with its axis at an angle of ±45° with respect to the *y* axis. The linearly polarized beam of light 30 is then incident upon the display device 10 (now connected from any external voltage source), which has undergone the above "WRITE-IN" procedure. The optical analyzer 33, with its axis advantageously parallel to the axis of the polarizer 32, allows passage of only that portion of the beam 30, which traverses the device 10 in the region of the arrow 11.31.

Advantageously the "readout" beam 30 supplied by the source 31 is monochromatic with a wavelength of typically 6000 A. Moreover, the intensity of the "readout" beam 30 is advantageously at least an order of magnitude less than the "-write-in" beam 20, so that the "readout" beam 30 does not disturb the remanent polarization in the plate 11. Upon traversing the ceramic plate 11 in the device 10, the *x* and *y* components of the electric field associated with these polarizations of the "readout" beam 30 in the plate 11 (extraordinary and ordinary rays) undergo two different phase shifts due to birefringence in the plate 11. However, this difference in phase shifts occurs only in those portions of the plate 11 whose remanent polarization have not been switched into the *z* direction by the "WRITE-IN" beam 20. Preferably, the thickness of this plate 11 is selected such that the difference in these two phase shifts is equal to one-half a wavelength (or alternatively an odd multiple of half a wavelength, i.e., an odd integral multiple of $\pi$ radians retardation). For lead zirconate-lead titanate 65/35–2 % La having a difference in ordinary and extraordinary retractive indices equal to 0.002 and in which the RESET state corresponds to a remanent polarization of the ceramic 11 in parallel to the ±*y* direction, 14 microns of thickness (or odd integral multiple thereof) is sufficient, being equivalent to a relative retardation of $\pi$ radians for ordinary and extraordinary rays in a "readout" beam 30 having a wavelength on vacuum equal to 6000 A. However, it should be understood that correspondingly greater thicknesses, typically 50 microns, should be used for the ceramic plate 11 in case the "RESET" state is oblique with respect to the ±*y* direction. Thus, in any event, the plane of polarization of the "readout" beam 30 is effectively rotated by 90° in the *xy* plane upon passage through the portions of the plate 11 which have not been affected by the earlier WRITE-IN 20, i.e., those portions of the plate in which the ordinary and extraordinary components of the 45° polarized "readout" beam 30 suffer relative phase retardation (due to the fact that the remanent electric polarization of the ferroelectric in the plate 11 is still in the ±*y* direction). In the remaining portions of the plate 11 where the remanent polarization is in the *z* direction, no relative phase shift is undergone by the *x* component relative to the *y* component of the electric field associated with the "readout" beam 30 passing through the plate 11. Preferably, the orientation of analyzer film 33 is parallel to the polarization direction of the axis of the polarizer 32. Thus, the exit beam 30.5 is impressed with a pattern of bright and dark portions. The bright portions correspond to those portions of the plate 11 in the "T" state i.e., previously illuminated by the "WRITE-IN" beam 20; while the dark portions of the exit "readout" beam 30.5 correspond to those portions still in the "L" state, i.e., not previously illuminated by the "WRITE-IN" beam 20. Thus, the exit beam 30.5 furnishes a "positive" type of optical display picture of the information "written in" by the beam 20.

The exit beam 30.5 from the optical analyzer 33 is incident upon the utilization means 34 for detection and use of the information contained in this pattern of bright and dark portions thereof.

FIG. 2.1 shown a front perspective view of an optical image and memory display device 10.1 which is similar to the device 10 shown in FIGS. 1 and 2. Whereas the device 10 is especially useful in conjunction with a discrete type of WRITE-IN process, the device 10.1 is especially useful in conjunction with a continuous type of two-dimensional WRITE-IN process, as will become clearer after a discussion of the structure of the device 10.1 There are many elements in FIG. 2.1 which are the same as previously described in connection with FIGS. 1 and 2, and these elements have been denoted by the same reference numerals.

The device 10.1 contains the fine grain ferroelectric ceramic plate 11 together with the photoelectric layers 12 and 13 on its front and rear surfaces respectively, just as in FIGS. 1 and 2. Moreover, the interdigitated electrodes 14 and 15 on the front surface of the plate 11 in the device 10.1 are of the same structure as previously discussed in connection with the device 10. However, upon the rear surface in the device 10.1 is located a pair of interdigitated electrodes 14.1 and 15.1, each of which is parallel and directly opposite to the electrodes 14 and 15, respectively.

An electrical switch 28 with eight output terminals 28.1–28.8 can be set in two positions upwards and downwards, indicated by the double arrow 27. As shown in FIG. 2.1, the switch 28 is in the downward position for the purpose of the WRITE-IN process, that is, while the device 10.1 is being illuminated with the modulated scanning "write-in" beam of light 20.1. This write-in beam 20.1 is incident upon a selected location of the device 10.1 during WRITE-IN. The beam 20.1 is supplied by the optical source 21 of a beam of light 20 in combination with an optical modulator 23 and an XY optical scanner 24. An optical shutter 22 is located in the path of the beam 20, in order to allow the modulated scanning beam 20.1 to be incident upon the device 10.1 only during the WRITE-IN procedure.

During the ERASE procedure, the switch 28 is set in the upward position. In this position of the switch 28, the positive terminal of the DC supply 17 is connected to output terminals 28.1 and 28.3, whereas the ground terminal of the DC supply 17 is connected to output terminals 28.5 and reproducible Thereby, the electrode 14 on the front surface and the electrode 14.1, on the rear surface are both at a similar positive potential with respect to the electrode 15 on the front surface and the electrode 15.1 on the rear surface. Thus, an electric field is produced in the plate 11 in the ±*y* directions, which induces a remanent electric polarization in the plate 11 in the ±*y* directions, in the same pattern as previously discussed in connection with arrows 11.1–11.4 in FIGS. 1 and 2. It should be noted that the contribution to this electric field produced by the electrodes 14 and 15 is in the same direction as the contribution produced by the electrodes 14.1 and 15.1 Thereby, the contribution to the electric field in the plate 11 in the ±*y* directions due to the electrodes 14 and 15 on the front surface cooperates with that due to the electrodes 14.1 and 15.1 on the rear surface, thus yielding a reproducible ERASE (or RESET) state of remanent electric polarization in the plate 11. During this ERASE process, the shutter 22 is set in a state which prevents the beam 20 from passing through to the device 10.1 so as not to confuse the ERASE process.

In order to WRITE-IN the described pattern in the plate 11, the switch 28 is set in the downward position (that is, the position actually illustrated in FIG. 2.1) while the shutter 22 is set in a state ("OPEN" which allows passage of the beam 20. With the shutter 22 in this "OPEN" position, the modulator 23 combined with the XY scanner 24 produces a modulated scanning beam of light 20.1 which is incident upon the device 10.1. Advantageously the locus of scanning of the beam 20.1 is confined to the horizontal strip spaced between the interdigitated electrodes 14.1 and 15.1, that is, the region where the ERASE process was effective in setting the remanent electric polarization in the plate 11 in the *y* directions. As the beam 20.1 thus scans the device 10.1, the intensity of this beam 20.1 is modulated in accordance with a desired pattern of WRITE-IN, and this produces a rotation of the direction of electric polarization in the plate 11 in accordance with the pattern, as should be obvious from the following consideration of the effects of the switch 28 in the downward position.

When the switch 28 is set in the downward position, terminals 28.2, 28.4, have an equal (positive) potential with respect to the thereby-grounded terminals 28.6 and 28.8. Thus, the electrodes 14 and 15 on the front surface are at a positive and equal potential with respect to the grounded electrodes 14.1 and 15.1 on the rear surface. Due to the photoconductivity property of the photoconductive layers 12 and 13, at those (and only those) locations at the horizontal strip spaces between the interdigitated electrodes 14.1 and 15.1 at which the beam of light 20.1 impinges with maximum intensity, the electric field in those locations will most strongly tend to be in the *z* direction. Thereby, the remanent electric polarization in the plate 11 at those and only those locations will be rotated toward the *z* direction, just as discussed previously in connection with the arrow 11.13 in FIG. 2. Moreover, the average amount of rotation at any location will follow the pattern of the degree of modulation in the light beam 20.1 produced by the modulator 23. Thereby, after a complete single scanning of the device 10.1 by the beam 20.1, the plate 11 in this device is impressed with a pattern of remanent electric polarization corresponding to the pattern impressed by the modulator 23 on the beam 20.1.

READOUT of the pattern of remanent polarization impressed by the modulated scanning beam 20.1 onto the device 10.1 can be accomplished as previously discussed in connection with FIG. 3 merely by substituting the display device 101 for the display device 10.

FIG. 4 illustrates a cross-sectional side view of a ferroelectric optical display device 40 in accordance with another specific embodiment of the invention. The display device 40 is similar to the previously described display device 10 in many respects; therefore, the same reference numerals in FIG. 4 are used as in FIGS. 1 and 2 to indicate identical items in common with the devices 10 and 40. In the display device 40 the ratio of the equal widths *a* of the electrodes 47 and 48 to the distance *b* between successive neighboring such electrodes is advantageously of the order of about one-tenth or less. This geometry enables the use in the device 40, of an optically transparent, electrically conducting electrode film 46, instead of the previously described metal electrode mask 16 in the device 10. Typically, the film 46, is a layer of essentially tin oxide, less than about 1 micron thick, formed by sputtering tin in an oxygen atmosphere. Alternatively, a layer of indium oxide less than about 1 micron thick can be used as the material for the film 46; or this film 46 can be a layer of gold approximately 3,000 A. thick, which has been vapor deposited upon a layer of chromium about 50 A. thick. Otherwise, the device 40 is similar to the device 10, and its operation is likewise similar.

In FIG. 4, by way of example, the "RESET" or "ERASE" period is illustrated (by virtue of the position of the switch 18). It should now be obvious that the subsequent "WRITE-IN" process can be accomplished by means of an optical beam (typically a laser beam) of confined cross section which is incident upon selected portions of the conducting film 46, just as the optical source 21 in the case of the device 10 illustrated in FIG. 2. Likewise, "READOUT" of the device 40 is accomplished simply by substituting the device 40 for the device 10 in FIG. 3.

FIG. 5 illustrates an optical image storage and display system, of the flat panel wall type, capable of continual and geometrically selective ERASE (RESET), WRITE-IN, and READOUT processes. Some of the elements in the system shown in FIG. 5 are the same as previously discussed above; therefore, the same reference numerals are used to identify these common elements. An optical display device 50 contains the fine grain ferroelectric ceramic plate 11 with the photoconductive layer 12, the transparent conductive layer 16, and a polarizer layer 53 disposed in successive layers on the rear major surface thereof, together with an array of parallel horizontal electrodes 47.1–47.5 spaced apart by a distance of the order of one-hundredth of an inch on the front major surface 11.2 Each of the electrodes 47.1–47.5 is separately connected to a control switch 45.1 which is capable of applying a voltage supplied by the power supply source 45 to any of the electrodes 47.1–47.5 individually. An optical source 51 of a "READOUT" beam of light 51.5 is supplied with input power by the power supply 45, and is controlled by the switch 45.1, as described more fully below.

The beam of light 51.5 is incident upon a transparent plastic light guide 52 containing opaque horizontal strip portion 52.5 opposite the electrodes 47.3 and 47.4, which directs the optical radiation from the beam 51.5 serially through the polarizer layer 53, the transparent electrode 16, the photoconductive film 12, the plate 11, the photoconductive film 43 in the horizontal strip spaces between the electrodes 47.1–47.5, ultimately to the polarizer 33 serving as an optical analyzer and the utilization means 55 for detection of the READOUT beam 51,5 and use of the information therein. This information is in the form of dark and bright portions of the cross section of the READOUT beam 51.5 impressed upon it upon passing through the display device 50 and the polarizer 33. Advantageously the polarization axes of both the optical polarizer layer 53 and the optical polarizer 33 (analyzer) are mutually parallel at an angle of ±45° with respect to the *y* direction in the *xy* plane.

For the purpose of the "WRITE-IN" process, a laser 56 provides a plane wave beam of light 56.1. This beam 56.1 is processed by modulator 57 in combination with the horizontal *x*-scanner type of deflector 58; so that the beam 56.2 is impressed with a desired pattern of optical intensity modulation in time, as well as a horizontal deflection which is typically linear in time. In other words, the beam 56.2 is an intensity modulated, horizontally scanning beam, in accordance with the desired pattern to be displayed by the device 50.

The cylindrical lens 59 has a horizontal cylinder axis (Parallel to the *x* direction) and has a focal length which is small as compared to its distance from the device 50, typically by an order of magnitude. The beam 56.2 is incident upon this lens 59, thereby forming a "WRITE-IN" beam 56.5 which impinges on the plate 11 as an elongated rectangle 56.6 (in the *y* direction), with scanning in the horizontal *x* direction.

When it is desired to ERASE and WRITE-IN along a particular horizontal line in the *xy* plane of the ferroelectric plate 11, for example at the *y* coordinate corresponding to the particular horizontal strip-space ("line") the electrodes 47.2 and 47.3, then the control switch 45.1 is first set so as to apply (say) positive voltage from the power supply 45 to the electrodes 47.1–47.2 and negative voltage to the electrodes 47.3–47.5 in order to "ERASE" ("RESET") this particular "line." During this "ERASE" procedure, the control switch 45.1 is set simultaneously to turn off the laser 56 and the optical source 51 in order that the beams 56.5 and 51.5 should not interfere with the ERASE procedure. The applied voltage to the electrodes 47.1–47.2 and 47.3–47.5 is selected to produce an electric field in the plate 11 which is sufficient to switch the remanent polarization of the ferroelectric plate 11 into the "L" state along the particular horizontal strip-space underneath the gap between the electrodes 47.2 and 47.3. Typically, an electric field of 20X $10^3$ volt/cm. applied for a time interval of 10 milliseconds is sufficient for this and RESET" purpose. Then the control switch 45.1 connects all the electrodes 47.1–47.5 except for the electrodes 47.1 and 47.3 to the transparent conductive film 16 and to one terminal of the power supply 45, in order to apply a (say) positive voltage to the electrodes 47.1, 47.4–47.5 and to the conductive film 16. The electrodes 47.2 and 47.3 are simultaneously connected by the control switch 45.1 to another terminal of the power supply 45, in order to produce an electric field in the *z* direction of about $20\times10^3$ volt/cm. normal to the plane of the plate 11 when and if the beam 56.5 is incident thereon with sufficient intensity to render the photoconductive films 12 and 43 electrically conducting. The amplitude of the WRITE-IN beam 56.5 is controlled by the modulator 57, which modulates this intensity to a maximum when and if the horizontal *x* location of the vertical line of incidence of the beam 56.5 on the plate 11 is at selected locations. By reason of the photoconductive film 16, as the scanning WRITE-IN beam 56.5 scans the plate 11, only the selected horizontal $x$ locations of the plate 11 along the horizontal strip-space between the electrodes 47.2 and 47.3 are subjected to an electric field in the $z$ direction which is appreciably higher than that in the remaining other horizontal $x$ locations along this horizontal strip-space. Thus, the electric field in the $z$ direction in the plate 11 is made sufficient to switch the remanent polarization by a 90° spatial rotation into the "T" state only in the selected horizontal $x$ locations between the electrodes 47.2 and 47.3. In this way, WRITE-IN is accomplished at selected horizontal $x$ locations for any given vertical $y$ location.

For the "READOUT" procedure, the control switch 45.1 first disconnects the power supply from the electrodes 47.1–47.5 and the conductive layer 16, as well as from the laser 56. Then the control switch 45.1 connects the monochromatic optical source 51 to the power supply 45, in order to provide the "READOUT" beam 51.5. Upon passage through the device 50, the direction of the polarization of the cross section of this beam 51.5 is impressed with a pattern of regions where the polarization of the beam has been rotated by 90°, these regions corresponding to the $(x, y)$ locations of the "T" states in the plate 11. The beam 51.5 exiting from the device 50 is incident upon the polarizer 33, serving as an optical analyzer, with its axis of polarization parallel to that of the polarizer layer 53. Thereby, the regions of the beam 51.5 corresponding to the "T" states are transmitted, while the regions corresponding to the "L" state are extinguished. After passage through the polarizer 33, the beam 51.5 is collected by the utilization means 55 for use of the desired pattern of information impressed on this beam by the device 50.

It should be noted that, as discussed thus far, a pattern of light of only a single color (monochromatic) is displayed by the beam 51.5 exiting from the device 50. However, three or even more different desired colors may also be displayed using a suitably fast sequential color-scan technique. In this technique, the READOUT optical source 51 sequentially produces the desired colors during the READOUT procedure; whereas just prior to READOUT of each different color, the plate 11 is subjected to a RESET process corresponding to that color. In this RESET process, the voltage applied in the $y$ direction is made to be sufficient to switch the remanent polarization of selected portions of the plate 11 by a spatial rotation from the "T" state to another state corresponding to a half wavelength (or odd multiple thereof) retardation of the ordinary relative to the extraordinary ray of that color which is to be viewed immediately thereafter. Moreover, gray levels in the beam 51.5 may be impressed thereon by utilizing continuous rather than digital modulation of the intensity of the WRITE-IN beam 56.1 by the modulator 57.

Whereas FIG. 5 shows a flat panel wall type of optical image storage and display system, FIG. 6 shows a projection type of optical image storage and display system. The system shown in FIG. 6 is also adapted for ERASE, WRITE-IN, and READOUT portions of the cycle. In FIG. 6, moreover, the display device 40 is the same as the display device 40 discussed above in connection with FIG. 4, while the polarizer 32 and the analyzer 33 are the same as discussed above in connection with the system shown in FIG. 3. Likewise, the laser 56 and the modulator 57 in FIG. 6 are the same devices used for the WRITE-IN as in FIG. 5; but a conventional $xy$ scanner type of deflector 68 shown in FIG. 6 differs from the deflector 58 shown in FIG. 5 in that the deflector 68 scans the laser beam 66.5 both in the $x$ and $y$ directions upon the display device 40. The power supply 65 feeds power to the laser 56, the modulator 57, the $xy$ deflector, 68, and the electrodes of the display device 40 each of whose voltage potential is controlled by a control switch 65.1. This control switch 65.1 functions in a similar manner as the control switch 45.1 in FIG. 5, except that due to the both $x$ and $y$ scanning by the $xy$ scanner type of deflector 68 (rather than merely $x$ scanning by the deflector 58), the control by the switch 65.1 over the voltage supplied to the interdigitated electrodes on the front surface of the display device 40 used in the system shown in FIG. 6 is simpler than in the system shown in FIG. 5 (as indicated by terminals 18.2 and 18.3 in FIG. 4). In particular, there is no need for more than two wire leads from the control switch 65.1 to the interdigitated electrodes on the front surface of the device 40 (shown in detail in FIG. 4) as employed in the system shown in FIG. 6. Thus, the interdigitated electrodes 47 and 48 are all supplied voltage simultaneously during the WRITE-IN process, in order to produce the electric field in the plate 11 which induces the "L" state at those portions thereof which are simultaneously illuminated by the laser beam 66.5 as modulated in its intensity by the modulator 57. In addition, a dichroic mirror 69, advantageously oriented at an angle of 45° with respect to the $y$ axis in the $yz$ plane, reflects the WRITE-IN laser beam 66.5 (onto the display device 40); whereas this mirror 69 transmits the READOUT light wave 61.5 of different frequency (color) from that of the WRITE-IN beam 66.5.

The READOUT optical wave 61.5 is supplied by the source 61 which obtains power from the power supply 65. Only during the READOUT portion of the cycle, the control switch 65.1 allows the electronic shutter 62.5 to transmit the beam 61.5 to the device 40, but not otherwise. During the READOUT, the light wave 61.5 is incident upon the polarizer 32, whose axis advantageously is set at an angle of 45° in the $xy$ plane with respect to the $\pm y$ axis. Also, during READOUT, the wave 61.5 passes through the condenser lens 62.1, through the display device 40 and the optical analyzer 33 whose axis is parallel to that of the polarizer 32. The projection lens 62.2 then focuses the wave 61.5 upon the viewing screen 65 upon which the desired image is thereby displayed It should be obvious that the display device 40 in the system shown in FIG. 6 can be ERASED in the same manner as previously described in connection with FIG. 4, that is, by applying an electric field in the $z$ direction to the plate 11 by means of a voltage from the power supply 65 as controlled by the switch 65.1.

Although this invention has been described in detail in terms of lanthanum-doped lead zirconate-lead titanate for ferroelectric ceramic material in the plate, other materials can also be used therefor. For example, bismuth-doped lead zirconate-lead titanate can also be used, although it has been found to yield less birefringence and so must be made thicker (with more consequent absorption) than lanthanum-doped lead zirconate-lead titanate. Moreover, other types of fine grain ferroelectric ceramics may also be used as they become available in the art. It should be understood that various features in the various embodiments may be substituted in other embodiments; for example, the device 10.1 can be substituted for the device 40 in the system shown in FIG. 6. Moreover, the exposure time periods of the various WRITE-IN and ERASE processes will vary in accordance with the time constant of the photoconductive material used for the layers.

What is claimed is:

1. An optical image storage and display device which comprises:

a. a fine grain ferroelectric plate whose remanent electric polarization can be switched by an applied electric field from a first state to a second state, the direction of the remanent polarization of the second state being oblique with respect to that of the first state;

b. a first photoconductive layer disposed on a first major surface of the plate;

c. a pair of interdigitated first and second electrodes, each of which having a plurality of digits, disposed on a second major surface of the plate opposite to the first major surface, the first electrode being electrically connected to a first terminal an the second electrode being electrically connected to a second terminal;

d. a second photoconductive layer disposed on the second layer major surface at least in the space between the electrodes; and e. an electrode layer disposed on the first major surface such that when voltage supply means is connected across the first and second interdigitated electrodes and thence across the electrode layer and the pair of electrodes, first and second voltages are applied to the plate sufficient to produce first and second electric fields in the plate in first and second directions respectively, the first and second direction being mutually oblique, thereby to switch the remanent polarization of the plate into the first state, and to switch the polarization into the second state at selected portions of the plate according to a selected two-dimensional pattern of a first beam of optical radiation incident upon the first and second photoconductive layers both of which layers being photoconductively responsive to said first beam, sufficient to produce an electric field at the second portions of the plate in response to said first beam of optical radiation and to said voltage, sufficient selectively to switch the polarization of the plate into the second state according to the pattern.

2. The device recited in claim 1 in which the electrode layer on the first surface is a metal mask containing apertures located opposite the space between the electrodes on the second surface.

3. The device recited in claim 1 in which the pair of electrodes forms an interdigitated array and in which the electrode layer forms a second interdigitated array parallel and opposite to the first interdigitated array.

4. The device recited in claim 1 in which the electrode layer on the first surface is a transparent electrically conductive film.

5. The device recited in claim 1 in which the fine grain ferroelectric plate is essentially a fine grain ferroelectric ceramic plate.

6. The device recited in claim 5 in which the ceramic is essentially a lead zirconate-lead titanate composition.

7. The device in claim 6 in which the ceramic is essentially lead zirconate-lead titanate 65/35–2 percent La.

8. The device recited in claim 6 in which the lead zirconate-lead titanate composition is doped with a rare-earth impurity.

9. An optical display system which includes:

a. a fine grain, ferroelectric plate whose remanent electric polarization can be switched by an applied electric field from a first state to a second state, the direction of the remanent polarization of the second state being oblique with respect to that of the first state;

b. a first photoconductive layer disposed on a first major surface of the plate;

c. a pair of parallel electrodes disposed on a second major surface of the plate opposite to the first major surface, said electrodes running along a first spatial direction;

d. a second photoconductive layer disposed on the second major surface at least in the space between the electrodes;

e. an electrode layer connected to a terminal and disposed on the first major surface;

f. a source of a linearly polarized first beam of optical radiation incident upon the device so that the beam traverses the device, the first and second photoconductive layers being photoconductively responsive to a second optical beam which scans the photoconductive layers in the first direction and which beam has intensity at selected locations along the first direction sufficient to switch the polarization of the plate from the first and to the second state at the selected locations when an electric voltage is applied between the electrode layer and the pair of electrodes (while the pair is electrically connected to the same terminal) simultaneously with the scanning by the second optical beam; and g. an optical polarization analyzer upon which the beam is incident after traversing the plate in the absence of applied electric fields.

10. The system recited in claim 9 which further includes means for utilizing the first optical beam exiting from the analyzer.

11. An optical image storage system which includes:

a. the system recited in claim 9; and b. means for scanning the plate with the second beam of optical radiation in the presence of an applied electric field in the plate, in order to switch the remanent electric polarization of the selected portions of the plate into the second state.